US008971503B1

(12) United States Patent
Kargman

(10) Patent No.: US 8,971,503 B1
(45) Date of Patent: Mar. 3, 2015

(54) METHOD OF OPERATING AN ORDERING CALL CENTER USING VOICE RECOGNITION TECHNOLOGY

(71) Applicant: IPDEV Co., Chicago, IL (US)

(72) Inventor: James B. Kargman, Chicago, IL (US)

(73) Assignee: IPDEV Co., Chicago, IL (US)

( * ) Notice: Subject to any disclaimer, the term of this patent is extended or adjusted under 35 U.S.C. 154(b) by 0 days.

(21) Appl. No.: 13/855,330

(22) Filed: Apr. 2, 2013

Related U.S. Application Data

(60) Provisional application No. 61/618,944, filed on Apr. 2, 2012.

(51) Int. Cl.
H04M 1/64 (2006.01)
G10L 15/065 (2013.01)
H04M 3/51 (2006.01)

(52) U.S. Cl.
CPC ........... *G10L 15/065* (2013.01); *H04M 3/5166* (2013.01)
USPC .................................. 379/88.01; 379/265.13

(58) Field of Classification Search
CPC ............ H04M 2201/40; H04M 3/493; H04M 3/5175; H04M 3/5233; H04M 3/5183; H04M 11/045; H04M 3/42221; H04M 3/523; H04M 3/5166; H04M 3/42; H04M 2203/408; H04M 3/42153; H04M 3/4936; H04M 3/5133; H04M 3/4931; H04M 3/4933

USPC ........ 704/246, 251; 379/80, 84, 88.08, 88.16, 379/93.18, 88.01–88.05, 88.27, 93.12, 379/100.16, 388.04, 265.1–266.1

See application file for complete search history.

(56) References Cited

U.S. PATENT DOCUMENTS

| 5,661,784 | A * | 8/1997 | Zinke | 379/88.01 |
|---|---|---|---|---|
| 6,510,414 | B1 * | 1/2003 | Chaves | 704/270 |
| 7,542,902 | B2 * | 6/2009 | Scahill et al. | 704/251 |
| 7,606,713 | B2 * | 10/2009 | Thorner | 704/270.1 |
| 8,204,205 | B1 * | 6/2012 | Blanchard et al. | 379/265.01 |
| 2002/0169606 | A1 * | 11/2002 | Bantz et al. | 704/235 |
| 2004/0190687 | A1 * | 9/2004 | Baker | 379/88.01 |
| 2005/0096905 | A1 * | 5/2005 | Steinbiss | 704/233 |
| 2005/0216269 | A1 * | 9/2005 | Scahill et al. | 704/270.1 |
| 2007/0025528 | A1 * | 2/2007 | Knott et al. | 379/32.01 |
| 2007/0040026 | A1 * | 2/2007 | Vleet et al. | 235/383 |
| 2012/0045043 | A1 * | 2/2012 | Timpson | 379/88.04 |
| 2012/0284031 | A1 * | 11/2012 | Hain et al. | 704/275 |

* cited by examiner

*Primary Examiner* — Akelaw Teshale
(74) *Attorney, Agent, or Firm* — Drinker Biddle & Reath LLP

(57) ABSTRACT

A system and method are provided for operating a call order center, comprising: obtaining voice training data for a call center service representative (CCSR) for phrases associated with an ordering process or products associated with the call order center; receiving customer call for an order by the CCSR on a telephone; activating a voice recognition system that accesses the CCSR voice training data via a switch; during a telephone call, issuing commands and providing data by the CCSR associated with the order to the voice recognition system that are translated and entered into an ordering system by the voice recognition system; and deactivating the voice recognition system via the switch. A role can be assigned to or deassigned from an employee based on their location relative to a particular location point within a work area.

12 Claims, 2 Drawing Sheets

METHOD OF OPERATING AN ORDERING CALL CENTER USING VOICE RECOGNITION TECHNOLOGY

CROSS REFERENCE TO RELATED APPLICATIONS

The present application claims the benefit of U.S. Provisional Application No. 61/618,944, filed Apr. 2, 2012, entitled, "Method of Operating an Ordering Call Center Using Voice Recognition Technology", herein incorporated by reference.

BACKGROUND

Voice recognition (VR) technologies have been applied in a number of different business-related applications, including call centers. In a typical call center, an employee receives a telephone call from a customer who requests a purchase of one or more products and/or services. When making such orders, it is not unusual for a particular product or service to have various options associated with it. For example, when ordering a pizza, the size, crust, and toppings must be specified.

In order to eliminate live persons from telephone ordering systems, voice recognition technologies have been applied in which the customer talks solely with a voice recognition application that answers the customer's call. However, given today's technology, this presents a number of problems. An inaccurate transcription of voice to text can be particularly problematic in the context of an ordering system, since errors can have significant and immediate financial consequences. For example, if a customer intended to order fifteen large, thick-crust, sausage pizzas for an event, and the VR ordering system mistook "fifteen" as "fifty", this would be unacceptable.

One of the problems with having VR call center/ordering systems is that VR systems can significantly improve their accuracy if the system has been trained to recognize a particular user's voice. There is a significant degree of variability between users' voices, and the system being trained for a particular user often results in a substantial accuracy improvement. However, with the VR call center/ordering system, many users that call in are first-time users, and thus there is no training data available on the VR system for the new caller.

Furthermore, it is unlikely that a new caller to an ordering system would be willing to spend the time and effort needed to train the VR system in recognizing the caller's voice—such training sessions can last ten to twenty minutes. Finally, the telephone frequency bandwidth is 300-3400 Hz. Since voice information usable for distinguishing among individuals exists outside of these frequencies, VR input and possible training information that is handled over the telephone will of necessity not be as effective or accurate as that which takes into account the full range of human voice.

SUMMARY

A system and method are provided for operating a call order center, comprising: obtaining voice training data for a call center service representative (CCSR) for phrases associated with an ordering process or products associated with the call order center; receiving customer call for an order by the CCSR on a telephone; activating a voice recognition system that accesses the CCSR voice training data via a switch; during a telephone call, issuing commands and providing data by the CCSR associated with the order to the voice recognition system that are translated and entered into an ordering system by the voice recognition system; and deactivating the voice recognition system via the switch.

A system and method are also provided for assigning a role or a status to an employee based on an employee location within a work location, comprising: defining a location point having location point information within the work location; determining location information of the employee; determining a location value that includes both the location point information and the employee location information; changing at least one of a status and a role of the employee if the location value meets a predefined criteria.

DESCRIPTION OF THE DRAWINGS

The drawings illustrate various embodiments of the invention, in which.

DETAILED DESCRIPTION

Various embodiments of the invention provide a hybrid voice recognition call center system that capitalizes on the benefits of VR, but is highly accurate and avoids the problems noted above. Therefore, what is provided herein is a voice recognition call center system that keeps an actual person in the call service center in the loop, but leverages their effectiveness by use of VR technologies.

Figure 1:
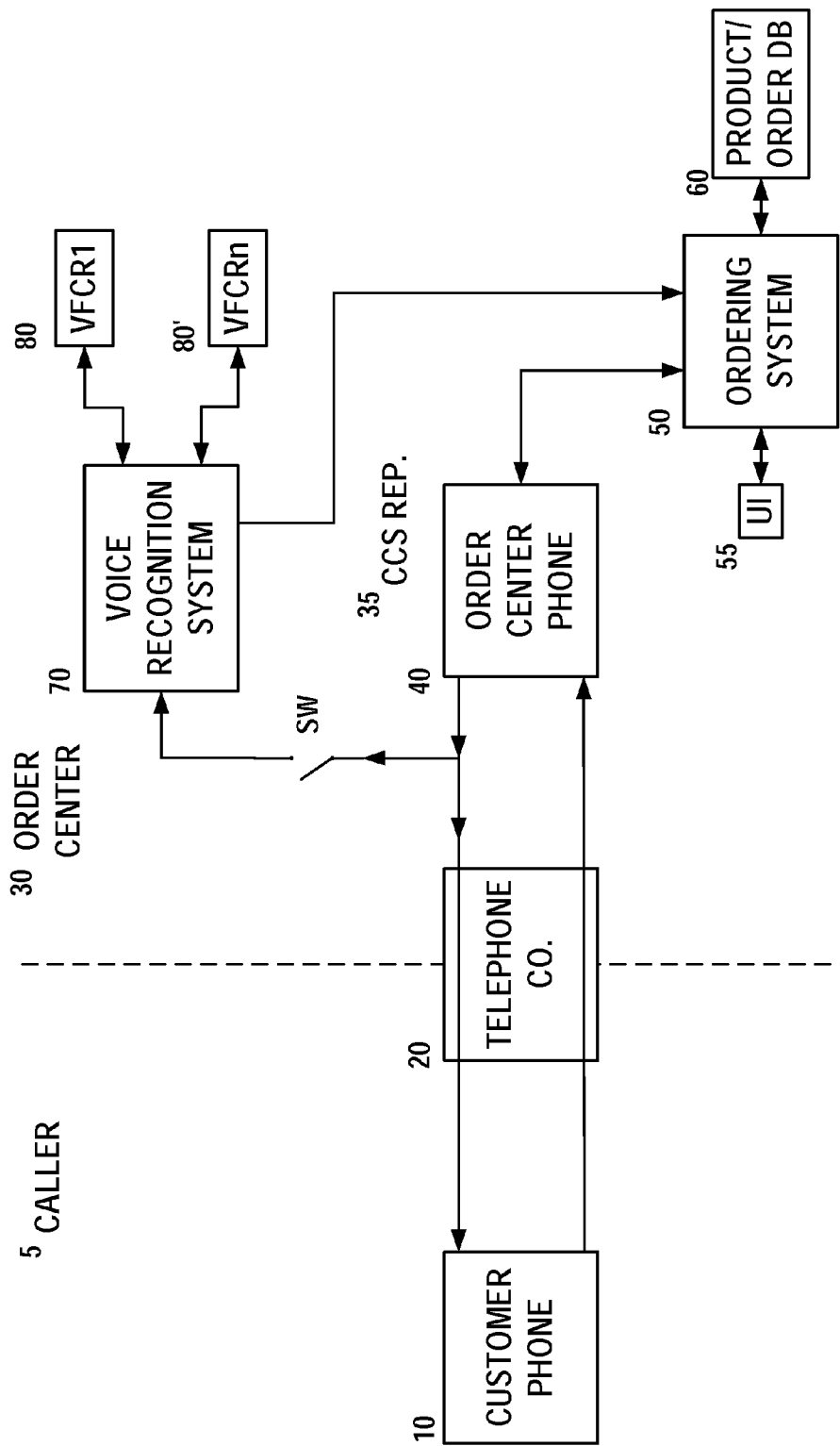
FIG. 1 is a block diagram illustrating an embodiment of the call center.

As shown in FIG. 1 a caller (customer) 5 uses their telephone 10 to place a typical telephone order with an order center 30 using lines of the telephone company 20 to contact a call center service representative (CCS rep.) 35 who uses an order center phone 40. Similar to a traditional telephone order center, the CCS rep. utilizes an ordering system 50 that has a user interface 55 for interacting with the ordering system 50, and has an associated product/order database 60.

However, this order center 30 utilizes the hybrid voice recognition system 70 as described below.

In this system, the order center 30 is established with CCS reps. 35 who undergo voice training with the VR ordering system 50 so that the VR ordering system 50 can improve the VR accuracy for that particular CCS representative 35.

In an embodiment, the training involves key phrases associated with the ordering system itself 50, such as product names and parameter values associated with the particular products that might be stored in the product/order database 60. These key phrases for the training could be created by a search algorithm that takes a snapshot of system inventory at a particular point in time and prepares training phrases based on this snapshot. Additionally, time invariant training phrases could also be included that do not depend on dynamically changing criteria, such as "order quantity". Advantageously, the invariant training phrases do not need to be retrained for a given CCS rep. 35, whereas periodic trainings could be utilized to capture dynamically changing data.

Advantageously, the CCS reps. 35 are preferably providing the training data and communications with the VR ordering system using quality audio components (especially microphones) that are able to capture a much broader frequency range than that of the telephone, resulting in a highly accurate VR system 70 when used with a particular CCS representative. Each CCS rep. may have their own individual training data VFCRx 80, 80' associated with the VR system 70. The VR system 70 is able to take advantage of quality audio along with training information, and the CCS rep. 35 is able to leverage the benefits of the VR system 70 by rapidly processing the CCS rep's. 35 voice commands that would otherwise have to be much more slowly entered by hand.

The accuracy of the VR system 70 can be significantly improved if the voice audio is input to the VR system 70 prior to being down-converted by the telephone company 20. Thus, the VR system 70 can utilize a significantly wider bandwidth than the telephone frequency bandwidth of 300-3400 Hz.

In an embodiment, the VR application 70 is not active all of the time for a CCS rep. 35, but rather may be activated and deactivated using a switch SW. This switch SW may be a software switch that is operable by the use of certain key words or phrases, such as "may I take your order", "begin order", or "end of order". Alternately, some form of hardware (e.g., a switch) or other form of software trigger to can be used to begin and end the VR transcription as well.

The VR application 70 may interface with a display screen of the ordering system 55 or a display of its own (not shown) so that in the unlikely event that a transcription error occurs, the CCS rep. 35 can quickly correct the error and continue on with the ordering process for the customer/caller 5. Such a display system could be significantly enhanced by utilizing a camera that is able to recognize user gestures and assist in the taking of an order.

By way of example, the camera system could detect and track where the CCS rep. 35 is looking at the screen, and various voice commands could be utilized in combination with this recognition. For example, the CCS rep. 35 could be looking at an input field on the screen for filling in a purchase quantity. The camera system identifies that the quantity field is thus "selected", and when the CCS rep. 35 says "six", the computer system can know to enter the number six into the quantity field. Other sorts of facial gestures could be recognized and used. For example, a right eye blink could be used to move forward a page/form or field, and a left eye blink could be used to go back a page/form or field. A grimace, smile, frown or other facial gesture could be utilized as well, and customizably be mapped into various actions. The scope is not limited to facial gestures—hand gestures, body positions, etc. could also be utilized to assist. Although a high-definition video camera is preferable to most clearly be able to determine gestures, other less sophisticated devices could be used, such as an infrared detector that functions as a motion sensor or performs thermal imaging.

In the event a CCS rep. 35 is visually impaired, order screens could be designed that assist the rep. in taking orders, such as the use of bright colored fields, in combination with, e.g., the eye position detector. Furthermore, forms of tactile feedback (e.g., vibration/haptic) or audio feedback could be utilized as well to assist such visually impaired individuals in ensuring that the orders are correct.

Trigger phrases for the VR application 70, as well as any content used by it, can take place in band (i.e., in the normal flow of the conversation with a customer), or take place out of band (i.e., not in the voice flow of the customer conversation). In a preferred embodiment, the VR ordering system is configured to operate during the course of a call with the customer. In this configuration, it would only utilize the voice signals associated with the CCS rep. 35, and not those of the customer/caller 5. This could be performed in hardware, e.g., by providing a signal circuit only on the CCS rep's 35 microphone (as illustrated in FIG. 1, where the VR system 70 is attached to only an outgoing line, or could be isolated via some form of software. In this way, the customer 5 might be unaware that the CCS rep. 35 is interacting with the VR system during the course of the call.

Some or all of the VR transcribing could take place after the customer hangs up—for example, certain complex parameters or options that do not need to be expressly stated to the customer could be provided by the CCS rep. 35 after the call terminates.

Such a system could be provided for the entire ordering mechanism, or alternately could be utilized simply as an overflow mechanism based on distributed calls.

Figure 2:
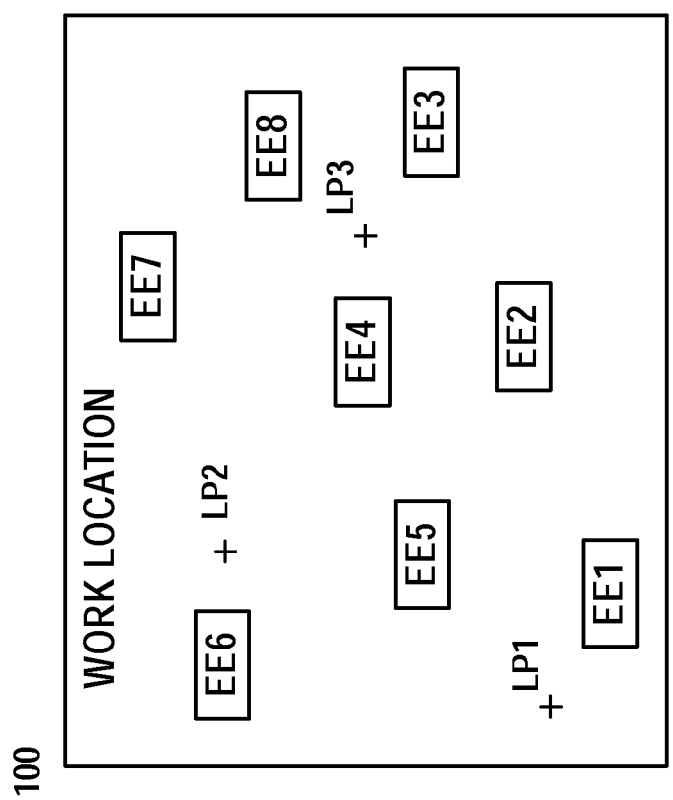
FIG. 2 is a map illustrating a location of employees and relevant location points within a work area.

In certain environments, the role of an CCS rep. 35 or order taker can be dynamically assigned to or removed from a larger group employees, and this can be done based on various factors. In one particular environment, the dynamic assignment and deassignment can take place dependent upon an employee's location, as is illustrated in FIG. 2. FIG. 2 is a map showing an exemplary work location 100 in which various employees EE1-8 are located throughout the work location 100 (which could include restrooms, and employee break area, actual work areas, etc.). FIG. 2 also illustrates specific location points LP1-3 that are used in the determination of the employee designations.

By way of example, in a coffee shop as the work location 100, an employee EE1 might be designated as an order taker (CCS rep.) 35 if they are within a particular area or a particular distance of a cash register (e.g., location point LP1), whereas if they are in the restroom or seated in a designated break area, they can be undesignated as an order taker. In this manner, the ordering system could ignore those who are not currently designated to be an order taker. Furthermore, the ordering system can assign calls to employees based on their designation as an active order taker.

The ability to determine whether an employee EE1 is in a particular area (within a predefined criteria of a location point LP1) can utilize, e.g., triangulation methods or other forms of GPS/position location technologies offered by communication service providers or custom installed location systems. Additionally, near field technology, radio frequency tags, infrared, Bluetooth, or an application on PDA or cellphone that updates the phone's location and sends that data on a schedule or on demand may be utilized for position information. This can also be combined with sensors that can detect if a particular person is in a particular area, either as they enter or leave the area, or by sensing their presence using ceiling or other location sensors.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A method for operating a call order center, comprising:
   obtaining voice training data from a call center service representative (CCSR) for phrases that the CCSR will use with an ordering process or products associated with the call order center;
   receiving customer call for an order by the CCSR on a telephone;
   activating a voice recognition system that accesses the CCSR voice training data via a switch by the CCSR;
   during a telephone call, issuing spoken voice commands and providing information by the CCSR associated with the order and corresponding to the CCSR voice training data to the voice recognition system that are translated and entered into an ordering system by the voice recognition system; and
   deactivating the voice recognition system via the switch by the CCSR.

2. The method according to claim 1, wherein the switch is a software switch and the activating is performed by the CCSR saying a predefined activation phrase.

3. The method according to claim 1, wherein the switch is a hardware switch that is activated by the CCSR physically interacting with the switch.

4. The method according to claim 1, further comprising:
   interacting, by the CCSR with the ordering system, to update the order information translated and entered by the voice recognition system.

5. The method according to claim 1, wherein the commands issued by the CCSR to the voice recognition system during the call are entered in an audio quality greater than a telephone company bandwidth of 300-3400 Hz.

6. The method according to claim 1, wherein the training data for the CCSR is divided into dynamically changing training data, and invariant training data.

7. The method according to claim 6, further comprising:
   periodically updating the dynamically changing training data, but not the invariant training data.

8. The method according to claim 1, wherein the commands issued by the CCSR are provided as in-band commands.

9. The method according to claim 1, further comprising:
   interacting, by the CCSR, with a display while the voice recognition system is active to modify the translated and entered commands or information.

10. The method according to claim 1,
    wherein the activating via a switch is done via a gesture of the CCSR.

11. A system for operating a call order center, comprising:
    a memory that stores voice training data from a call center service representative (CCSR) for phrases that the CCSR will use with an ordering process or products associated with the call order center;
    a telephone for receiving a customer call for an order by the CCSR;
    a switch that the CCSR utilizes to activate and deactivate a voice recognition system that accesses the CCSR voice training data; and
    a translator of the voice recognition system that translates, during a telephone call, spoken voice commands issued and information provided by the CCSR associated with the order and corresponding to the CCSR voice training data to the voice recognition system and enters the translated commands into an ordering system using a processor.

12. A method for operating a call order center, comprising:

obtaining voice training data for a call center service representative (CCSR) for phrases associated with an ordering process or products associated with the call order center;

receiving customer call for an order by the CCSR on a telephone;

activating a voice recognition system that accesses the CCSR voice training data via a switch;

during a telephone call, issuing commands and providing information by the CCSR associated with the order to the voice recognition system that are translated and entered into an ordering system by the voice recognition system;

deactivating the voice recognition system via the switch; and obtaining information regarding a gesture of the CCSR and utilizing the obtained information to assist in entering or modifying the translated and entered commands or information.

* * * * *